US010282477B2

(12) United States Patent
Chen et al.

(10) Patent No.: US 10,282,477 B2
(45) Date of Patent: May 7, 2019

(54) METHOD, SYSTEM AND APPARATUS FOR SEARCHING FOR USER IN SOCIAL NETWORK

(71) Applicant: TENCENT TECHNOLOGY (SHENZHEN) COMPANY LIMITED, Shenzhen (CN)

(72) Inventors: Yuehai Chen, Shenzhen (CN); Kunfeng Rong, Shenzhen (CN); Junchao Chen, Shenzhen (CN); Leteng Weng, Shenzhen (CN); Qianya Lin, Shenzhen (CN); Hongyang Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 729 days.

(21) Appl. No.: 14/455,041

(22) Filed: Aug. 8, 2014

(65) Prior Publication Data
US 2014/0351377 A1    Nov. 27, 2014

Related U.S. Application Data

(63) Continuation of application No. PCT/CN2013/071265, filed on Feb. 1, 2013.

(30) Foreign Application Priority Data

Feb. 10, 2012 (CN) .......................... 2012 1 0029646

(51) Int. Cl.
G06F 15/16    (2006.01)
G06F 17/30    (2006.01)
(Continued)

(52) U.S. Cl.
CPC ......... *G06F 17/3087* (2013.01); *G06Q 10/10* (2013.01); *H04L 67/306* (2013.01);
(Continued)

(58) Field of Classification Search
CPC .... G06F 17/3087; G06Q 10/10; G06Q 50/01; H04L 67/306; H04W 4/02; H04W 4/023; H04W 4/2016
See application file for complete search history.

(56) References Cited

U.S. PATENT DOCUMENTS 8,688,143 B2    4/2014  Steenstra et al.
2004/0169674 A1  9/2004  Linjama
(Continued)

FOREIGN PATENT DOCUMENTS

CN    101049038 A    10/2007
CN    101073274 A    11/2007
(Continued)

OTHER PUBLICATIONS

Translation of Notice of Reasons for Refusal for Application No. 2014-555930 dated Sep. 29, 2015.
(Continued)

Primary Examiner — Suraj M Joshi
Assistant Examiner — Jaren Means
(74) Attorney, Agent, or Firm — Morgan, Lewis & Bockius LLP

(57) ABSTRACT

The present disclosure discloses a method, system and apparatus for searching for a user in a social network. A client obtains geographical position information of a user of the client after detecting that the user of the client transmits a searching command, and transmits a searching request to a server, wherein the searching request at least includes the obtained geographical position information of the user and a user identifier of the user. The server receives the searching
(Continued)

request, determines whether there is a piece of searching request information satisfying a requirement in various pieces of searching request information previously stored, and returns information related with a user corresponding to the piece of the searching request information satisfying the requirement to the client if there is the piece of the searching request information satisfying the requirement. Thus, validity of a searching result can be improved.

12 Claims, 1 Drawing Sheet

(51) Int. Cl.
    *H04W 4/02*     (2018.01)
    *H04L 29/08*     (2006.01)
    *G06Q 10/10*     (2012.01)
    *H04W 4/21*     (2018.01)
    *G06Q 50/00*     (2012.01)
    *H04W 4/20*     (2018.01)

(52) U.S. Cl.
    CPC .............. *H04W 4/02* (2013.01); *H04W 4/023* (2013.01); *G06Q 50/01* (2013.01); *H04W 4/206* (2013.01); *H04W 4/21* (2018.02)

(56) References Cited

U.S. PATENT DOCUMENTS

| | | | |
|---|---|---|---|
| 2005/0195952 A1 | 9/2005 | Dyer et al. | |
| 2006/0047825 A1* | 3/2006 | Steenstra | H04W 4/02 709/229 |
| 2006/0270419 A1* | 11/2006 | Crowley | H04M 3/42 455/456.2 |
| 2007/0036347 A1 | 2/2007 | Teicher | |
| 2009/0198666 A1* | 8/2009 | Winston | G06Q 50/01 |
| 2010/0274859 A1* | 10/2010 | Bucuk | H04L 63/08 709/206 |
| 2011/0142016 A1* | 6/2011 | Chatterjee | G06Q 30/02 370/338 |
| 2011/0143817 A1 | 6/2011 | Asabu et al. | |
| 2011/0179064 A1* | 7/2011 | Russo | G06Q 10/10 707/769 |
| 2012/0069131 A1* | 3/2012 | Abelow | G06Q 10/067 348/14.01 |
| 2012/0173373 A1* | 7/2012 | Soroca | G06F 17/30867 705/26.3 |
| 2012/0303425 A1* | 11/2012 | Katzin | G06Q 20/027 705/14.4 |
| 2013/0196690 A1 | 8/2013 | Crowley et al. | |
| 2013/0282438 A1* | 10/2013 | Hunter | G01S 1/02 705/7.32 |

FOREIGN PATENT DOCUMENTS

| | | | |
|---|---|---|---|
| CN | 101203041 | A | 6/2008 |
| CN | 101299769 | A | 11/2008 |
| CN | 101662403 | A | 3/2010 |
| CN | 101924996 | A | 12/2010 |
| CN | 102162854 | A | 8/2011 |
| CN | 102546656 | A | 7/2012 |
| EP | 1 467 536 | A1 | 10/2004 |
| JP | 11-252003 | A | 9/1999 |
| JP | 2003186900 | A | 7/2003 |
| JP | 2010033338 | A | 2/2010 |

OTHER PUBLICATIONS

"Google Search—Wikipedia, the free encyclopedia", Feb. 9, 2012 (Feb. 9, 2012), Retrieved from the Internet: URL:https://en.wikipedia.org/w/index.php?title=Google_Search&oldid=476024413, 12 pages.

Office Action in AU Application No. 2013218450 dated Mar. 16, 2016, 5 pages.

Office Action in EP Application No. 13 746 632.2 dated Mar. 1, 2016, 7 pages.

Sameed Khan, "Shake to launch Any App With AppShaker for Android", May 6, 2011, http://www.addictivetips.com/mobile/shake-to-launch-any-app-with-appshaker-for-android/, retrieved from the internet on Sep. 8, 2016, 2 pages.

Office Action in EP Application No. 13 746 632.2 dated Aug. 29, 2016, 6 pages.

Extended European Search Report in EP Application No. 13746632.2 dated Jul. 10, 2015.

Office Action from Australian Application No. 2013218450 dated Mar. 18, 2015.

Office Action from Singapore Application No. 11201404691U dated Mar. 23, 2015.

International Preliminary Report on Patentability from PCT/CN2013/071265 dated Aug. 21, 2014.

Office Action from Chinese Application No. 201210029646.3 dated Dec. 20, 2012.

International Search Report in PCT/CN2013/071265 dated May 16, 2013.

* cited by examiner

METHOD, SYSTEM AND APPARATUS FOR SEARCHING FOR USER IN SOCIAL NETWORK

This application is a continuation of Application No. PCT/CN2013/071265, filed on Feb. 1, 2013. This application claims the benefit and priority to of Chinese Patent Application No. 201210029646.3, entitled "method, system and apparatus for searching for a user in a social network" and filed on Feb. 10, 2012. The entire disclosures of each of the above applications contents of all of which are incorporated herein by reference in their entirety for all purposes.

FIELD OF THE INVENTION

The present disclosure relates to an internet technology, and particularly to a method, system and apparatus for searching for a user in a social network.

BACKGROUND OF THE INVENTION

In an existing social network, a user can search for users to be required, such as the users in an adjacent region of the user, according to geographical position information the user.

In particular, when a user X is to search for users in an adjacent region of the user X, the user X may transmit a searching command to a client of the user X, such as a mobile terminal. After receiving the searching command transmitted from the user X, the client obtains geographical position information of the user X, and transmits a searching request to a server, wherein the searching request carries information, such as the geographical position information, a user identifier of the user X, etc. The server can store the information that is referred as searching request information and is contained in the received searching request and can determine whether searching request information previously stored includes searching request information satisfying requirements, wherein the searching request information satisfying the requirements meets the following conditions: a distance between the user corresponding to the searching request information determined according to the geographical position information in the received searching request and the user X is less than a predetermined threshold. If the searching request information previously stored satisfies the above requirements, relative information of the user corresponding to the searching request information satisfying the requirements is returned to the client of the user X.

The relative information may include a user identifier, personal basic information and a distance between the user corresponding the relative information and the user X, wherein the personal basic information generally includes the information recorded when the user registers to a network, such as an age, a sex, a career, a city, etc. The personal basic information is stored in the server. The server may search for the corresponding personal basic information through the user identifier.

After receiving the relative information of the users from the server, the client may present the relative information to the user X. And the user X may select an interesting user, and transmit a message to communicate with the interesting user via the client.

In a practical application, the user X may transmit searching requests to the server through the client more than once, and all the searching requests may carry information including the geographical position information and the user identifier, etc. For the user X, the server only stores the geographical position information and the like carried in the searching request latest received. That is, the server may respectively update the previously received geographical position information and the like by the currently received geographical position information and the like.

However, in the practical application, provided that user Y is previously at location A, and transmits a searching request, and the geographical position information of the user Y in the searching request information stored in the server is the geographical position information when the user Y is at a location A. Thereafter, the user Y moves to a location B for some reasons, and does not yet transmit a searching request. Thus, when the user X transmits a searching request, the server will determine whether the user Y is in the adjacent region of the user X according to the geographical position information previously stored when the user Y is at the location A. If yes, the server will returns the relative information of the user Y to the user X. However, in actual, at this time, the user Y has already moved to the location B which may be quite far away from the user X. Since the user X only is interesting in users in the adjacent region of the user X, the relative information of the user Y returned from the server is invalid for the user X.

SUMMARY OF THE INVENTION

In view of the above, a method, a system and an apparatus for searching for a user in a social network is provided according to examples of the present disclosure in order to improve validity of the look up result.

In one aspect, a method for searching for a user in a social network includes:

obtaining, by a client, geographical position information of a user of the client after detecting that the user of the client transmits a searching command, and transmitting a searching request to a server, wherein the searching request at least includes the obtained geographical position information of the user and a user identifier of the user;

receiving, by the server, the searching request, storing a piece of searching request information, wherein the piece of the searching request information at least includes the geographical position information and the user identifier carried in the searching request received and receiving time when the searching request is received, determining whether there is at least one piece of searching request information satisfying a requirement in various pieces of searching request information previously stored, and returning information related with at least one user respectively corresponding to the at least one piece of the searching request information satisfying the requirement to the client if there is the at least one piece of the searching request information satisfying the requirement;

wherein for each piece of the searching request information satisfying the requirement in the at least one piece of the searching request information satisfying the requirement, the piece of the searching request information satisfying the requirement meets the following condition: a time interval between receiving time in the piece of the searching request information satisfying the requirement and the receiving time when the searching request transmitted from the client is received is less than a first threshold.

A system for searching for a user in a social network includes:

a client, configured to obtain geographical position information of a user of the client after detecting that the user of the client transmits a searching command, transmit a searching request at least carrying the obtained geographical position information of the user and a user identifier of the user to a server, receive information that is related with at least one user and is returned by the server; and the server, configured to receive the searching request, store a piece of searching request information, wherein the piece of the searching request information at least includes the geographical position information and the user identifier carried in the searching request received and receiving time when the searching request is received, determine whether there is at least one piece of searching request information satisfying a requirement in various pieces of searching request information previously stored, and return the information related with at least one user respectively corresponding to the at least one piece of the searching request information satisfying the requirement to the client if there is the at least one piece of the searching request information satisfying the requirement, wherein for each piece of the searching request information satisfying the requirement in the at least one piece of the searching request information satisfying the requirement, the piece of the searching request information satisfying the requirement meets the following condition: a time interval between receiving time in the piece of the searching request information satisfying the requirement and the receiving time when the searching request transmitted from the client is received is less than a first threshold.

A client includes:

a transmitting module, configured to obtain geographical position information of a user of the client after detecting that the user of the client transmits a searching command, transmit a searching request at least carrying the obtained geographical position information of the user and a user identifier of the user to a server; and a receiving module, configured to receive information that is related with a user and is returned by the server.

A server includes:

a storing module, configured to store a piece of searching request information, wherein the piece of the searching request information at least includes geographical position information and a user identifier carried in a searching request received and receiving time when the searching request is received, the searching request is transmitted to the server after the client detects that the user of the client transmits the searching command, and the geographical position information is obtained after the client detected that the user of the client transmits the searching command; and a processing module, configured to determine whether there is at least one searching request information satisfying a requirement in various pieces of searching request information previously stored, and return information related with at least one user respectively corresponding to the at least one piece of the searching request information satisfying the requirement to the client if there is the at least one piece of the searching request information satisfying the requirement, wherein for each piece of the searching request information satisfying the requirement in the at least one piece of the searching request information satisfying the requirement, the piece of the searching request information satisfying the requirement meets the following condition: a time interval between receiving time in the piece of searching request information satisfying the requirement and the receiving time when the searching request transmitted from the client is received is less than a first threshold.

It can be seen, by using the technical solution of the present disclosure, in the process of searching for a user, if a time interval between a time point when the user transmits its geographical position information and the current time point is great, it should consider that the user has changed its geographical position, and thus the user will not be included in a searching result, thereby improving validity of the searching result.

DETAILED DESCRIPTION OF THE INVENTION

In terms of the technical problems in the prior art, a technical solution for searching for a user in a social network is provided according to an example of the present disclosure.

In order to make the object, technical solution and merits of the present disclosure clearer, the present disclosure will be illustrated in detail hereinafter with reference to the accompanying drawings and specific examples.

Figure 1:
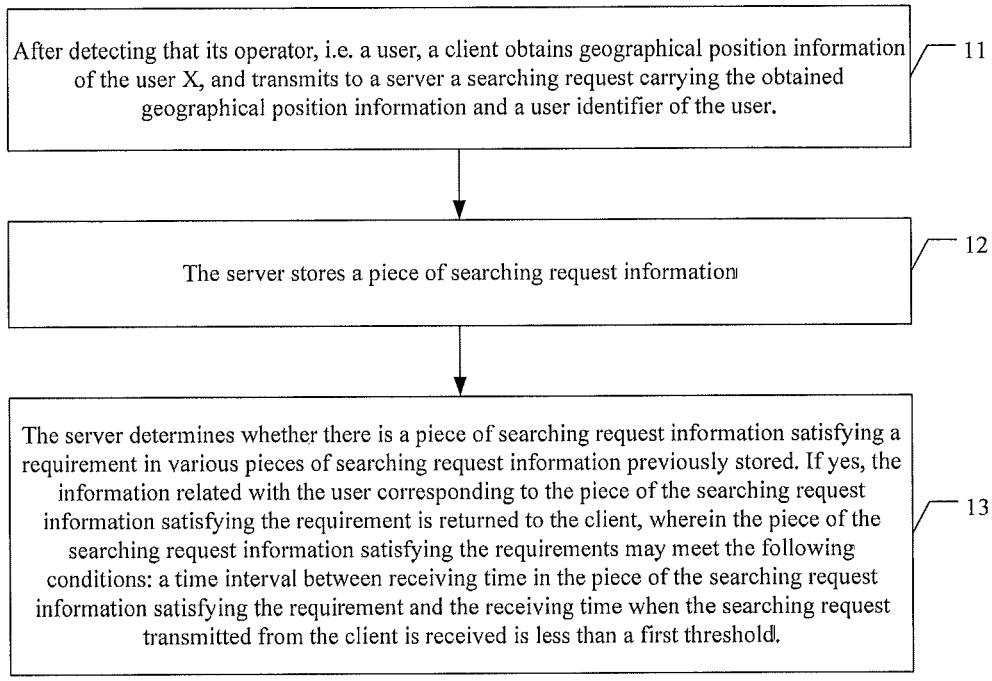
FIG. 1 is a flowchart illustrating a method for searching for a user in a social network according to an example of the present disclosure.

FIG. 1 is a flowchart illustrating a method for searching for a user in a social network according to an example of the present disclosure. As shown in FIG. 1, the method includes the procedure as follows.

At block 11, after detecting that its operator, i.e. a user (referred as "user X" in the present disclosure) transmits a searching command, a client obtains geographical position information of the user X, and transmits to a server a searching request carrying the obtained geographical position information and a user identifier of the user X.

The client may be a smart phone, a tablet computer, and so on, and the present disclosure does not make any limitation.

In a practical application, according to hardware configuration of the client, the client may adopt various ways to detect whether the user X transmits the searching command. In an example, for the client having a built-in sensor, such as a gravity sensor, a built-in gyroscope, a built-in accelerometer, the user X may transmit the searching command by shaking the client. As such, the client may detect that the user X transmits the searching command by detecting that the user X shakes the client. For the client not having the sensor, the client may receive the searching command from the user X through an icon configured on an interactive interface, a designated touch button configured or a command inputted via audio control. In an example, the user X clicks the icon configured on the interactive interface to transmit the searching command, the client receives the click inputted by the user X, that is, the client receives the searching command transmitted by the user X.

Thereafter, the client obtains the geographical position information (i.e. longitude and latitude information) of the user of the client. A method for obtaining geographical position information is similar with those in the conventional technology. In an example, a Global Positioning System (GPS) function may be used to obtain the geographical position information of the user of the client. In another example, a cell identifier (cell ID) of a base station to which the client belongs may be used to obtain the geographical position information of the user of the client. In another example, a Media Access Control (MAC) address of a Wireless Fidelity (WiFi) access point with which the client is connected may be used to obtain the geographical position information of the user of the client.

After the geographical position information of the user of the client is obtained, the client may add the geographical position information and other information such as a user identifier of the user X into the searching request and send the searching request to the server. A method for obtaining the user identifier of the user X is similar with that in a conventional technology.

At block 12, the server stores a piece of searching request information.

The stored piece of searching request information at least includes the information, such as the geographical position information, the user identifier and the like included in the received searching request, as well as receiving time when the searching request is received.

At block 13, the server determines whether there is a piece of searching request information satisfying a requirement in various pieces of searching request information previously stored. If yes, the information related with the user corresponding to the piece of the searching request information satisfying the requirement is returned to the client, wherein the piece of the searching request information satisfying the requirements may meet the following conditions: a time interval between receiving time in the piece of the searching request information satisfying the requirement and the receiving time when the searching request transmitted from the client is received is less than a first threshold.

In addition, in consideration of a case that the user X prefers to make a friend with a user in an adjacent region, the above mentioned piece of the searching request information satisfying the requirements may meet a condition as follows: the time interval between the receiving time in the piece of the searching request information satisfying the requirement and the receiving time when the searching request transmitted from the client is received is less than the first threshold, and a distance between the user corresponding to the searching request information satisfying the requirement and the user X is less than a second threshold, wherein the distance is determined according to geographical position information in the piece of the searching request information satisfying the requirement.

At blocks 12 and 13, after receiving the searching request transmitted from the client, the server stores the piece of the searching request information. The stored piece of the searching request information at least includes the information, such as the geographical position information, the user identifier and the like, contained in the received searching request, and the receiving time when the searching request is received (i.e. the current time when the searching request is received).

Thereafter, the server determines whether there is the piece of the searching request information satisfying the requirement in various pieces of the previously stored searching request information (which are pieces of searching request information other than the piece of the searching request information corresponding to the searching request transmitted from the client). If there is the piece of the searching request information satisfying the requirement, the information related with the user corresponding to the piece of the searching request information satisfying the requirement is returned to the client. The information related with the user may include a user identifier, personal basic information, a distance between the user and the user X, and so on.

In an example, the server may traverse the various pieces of the searching request information previously stored, and for each piece of the searching request information previously stored, if the distance between the receiving time of the piece of the searching request information and the receiving time when the searching request transmitted from the client is received is less than the first threshold and the distance between the user corresponding to the piece of the searching request information and the user of the client is less than the second threshold, it may consider that the piece of the searching request information meets the requirement, wherein the distance is determined according to geographical position information in the searching request information.

The values of the first threshold and the second threshold may be determined as required. For example, the first threshold may be 1 minute, and the second threshold may be 1000 meters.

If the number of pieces of the searching request information satisfying the requirement is more than M, that is, the number of users respectively corresponding to the piece of the searching request information satisfying the requirement to be returned to the client is more than M, M pieces of the searching request information may be selected, and the information related with the users respectively corresponding to the selected M pieces of the searching request information is returned to the client, wherein M is an integer more than 1, and the value can be determined as required, such as 20. During the process of selecting the M pieces of the searching request information, one or all of the following principles may be followed: a piece of the searching request information satisfying the requirement is preferred to be selected if there are more same items between the personal basic information of a user corresponding to the piece of the searching request information satisfying the requirement and the personal basic information of the user X; a piece of the searching request information is preferred to be selected if there are more identical items between the personal basic information of a user corresponding to the piece of the searching request information satisfying the requirement and features of a historically successful friend of the user X.

The personal basic information may be the information recorded when the user registers to a network, such as an age, a sex, a career, a city, etc., and is stored in the server. The server may search for the corresponding personal basic information through the user identifier.

In an example, provided that a user A has the same career and is at the same city with the user X, while a user B only has the same career with the user X, then the user A is preferred to be selected.

In another example, by analyzing features of a historically successful friend (for example, the user X and the friend are mutually added into an address list on WeChat) of the user X, it is determined that the user X prefers to make friends with the users of which age group, which kind of career, in which city, and so on. If the age, career and the city of a user C respectively satisfy a feature of the historically successful friend of the user X, while only the age of user D satisfies a feature of the historically successful friend of the user X, the user C is preferred to be selected.

At block 13, if all the pieces of the searching request information previously stored does not satisfy the requirement, the server determines that there is no piece of the searching request information satisfying the requirement, wherein a piece of searching request information not satisfying the requirement may include: a piece of searching request information receiving time of which does not satisfy the requirement while the distance of which satisfies the requirement, a piece of searching request information the receiving time of which satisfies the requirement while the distance of which does not satisfy the requirement, and a piece of searching request information both the received time and the distance of which do not satisfy the requirement. The piece of the searching request information receiving time of which does not satisfy the requirement may be a piece of searching request information that a time interval between the receiving time in the piece of the searching request information and the receiving time when the searching request transmitted by the client is received is no less than the first threshold. The piece of the searching request information the distance of which does not satisfy the requirement may be a piece of searching request information that the distance between the user corresponding to the piece of the searching request information and the user X is no less than the second threshold, wherein the distance is determined according to the geographical position information in the piece of the searching request information.

If the server determines that there is no piece of the searching request information satisfying the requirement, i.e., all pieces of the searching request information previously stored do not satisfy the requirement, content returned to the client by the server may be empty. Alternatively, if there is the piece of the searching request information the receiving of which satisfies the requirement while the distance of which does not satisfy the requirement, the information related with a user corresponding to the searching request information may be returned to the client. Moreover, if the number of users to be returned to the client is more than M, M users may be selected therefrom, and information related with the selected M users may be returned to the client. When selecting the M users, one or all of the following principles may be followed: a piece of the searching request information satisfying the requirement is preferred to be selected if there are more same items between the personal basic information of a user corresponding to the piece of the searching request information satisfying the requirement and the personal basic information of the user X; a piece of the searching request information is preferred to be selected if there are more identical items between the personal basic information of a user corresponding to the piece of the searching request information satisfying the requirement and features of a historically successful friend of the user X.

After receiving the information related with the users returned by the server, the client may present them to the user X, thereafter, the user X may select an interesting user from the presented users, and transmits a message to the interesting user through the client in order to communicate with the interesting user.

In a practical application, the user X may transmit searching requests to the server through the client more than once at different times. When transmitting a searching request each time, the searching request may carry information, e.g., geographical position information, a user identifier, etc. For the user X, the server only stores the geographical position information and the like carried in the latest received searching request.

In addition, when a piece of searching request information including information in the searching request transmitted by the client has been stored in the server for a time period more than the first threshold, the server may delete the piece of the searching request information so as to make protection of privacy of the user X, e.g., the geographical position better and to save storage space of the server.

As such, the method example of the present disclosure is completed.

Figure 2:
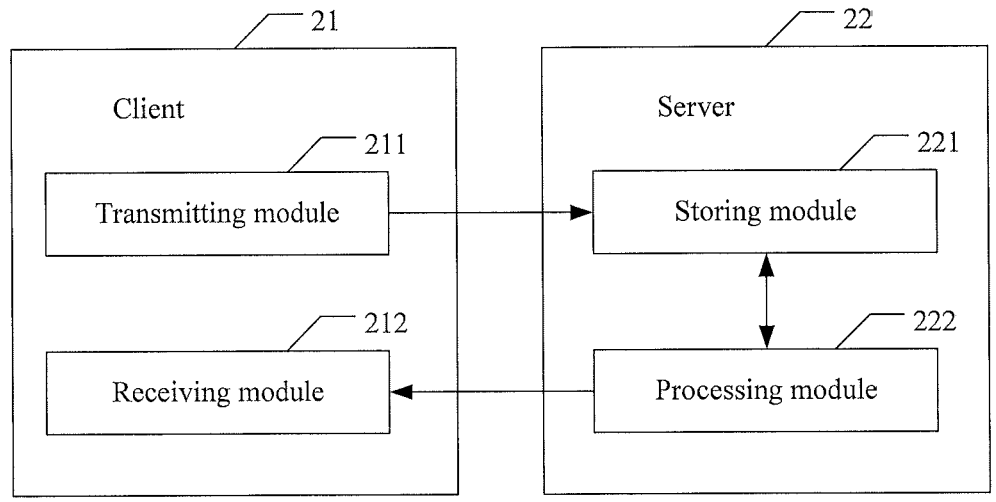
FIG. 2 is a schematic diagram illustrating a structure of a system for searching for a user in a social network according to an example of the present disclosure.

Based on the above description, FIG. 2 is a schematic diagram illustrating a structure of a system for searching for a user in a social network according to an example of the present disclosure. As shown in FIG. 2, the system may include:

a client 21, configured to obtain geographical position information of a user X after detecting that the user transmits a searching command, transmit a searching request at least carrying the obtained geographical position information and a user identifier of the user X to a server 22, receive information that is related with at least one user and is returned by the server 22; and the server 22, configured to receive the searching request, store a piece of searching request information, wherein the piece of the searching request information at least includes the geographical position information and the user identifier carried in the searching request received and receiving time when the searching request is received, determine whether there is at least one piece of searching request information satisfying a requirement in various pieces of searching request information previously stored, and return the information related with at least one user respectively corresponding to the at least one piece of the searching request information satisfying the requirement to the client 21 if there is the at least one piece of the searching request information satisfying the requirement, wherein for each piece of the searching request information satisfying the requirement in the at least one piece of the searching request information satisfying the requirement, the piece of the searching request information satisfying the requirement meets the following condition: a time interval between receiving time in the piece of the searching request information satisfying the requirement and the receiving time when the searching request transmitted from the client is received is less than a first threshold.

For each piece of the searching request information satisfying the requirement in the at least one piece of the searching request information satisfying the requirement, the piece of the searching request information satisfying the requirement further meets the following condition: a distance between the user corresponding to the piece of the searching request information satisfying the requirement and the user X of the client is less than a second threshold, wherein the distance is determined according to geographical position information in the piece of the searching request information satisfying the requirement.

The client terminal 21 may include:

a transmitting module 211, configured to obtain geographical position information of a user X of the client 21 after detecting that the user X of the client 21 transmits a searching command, transmit a searching request at least carrying the obtained geographical position information of the user and a user identifier of the user to a server 22; and a receiving module 212, configured to receive information that is related with a user searched out and is returned by the server 22.

The transmitting module is further configured to detect that the user of the client transmits the searching command if it is detected that the user X shakes the client 21; or the transmitting module is further to detect that the user of the client transmits the searching command if an input from the user X is detected.

The server 22 may include:

a storing module 221, configured to store a piece of searching request information, wherein the piece of the searching request information at least includes geographical position information and a user identifier carried in a searching request received and receiving time when the searching request is received, the searching request is transmitted to the server after the client 21 detects that the user X of the client transmits the searching command, and the geographical position information is obtained after the client detects that the user of the client transmits the searching command; and a processing module 222, configured to determine whether there is at least one searching request information satisfying a requirement in various pieces of searching request information previously stored, and return information related with at least one user respectively corresponding to the at least one piece of the searching request information satisfying the requirement to the client 21 if there is the at least one piece of the searching request information satisfying the requirement, wherein for each piece of the searching request information satisfying the requirement in the at least one piece of the searching request information satisfying the requirement, the piece of the searching request information satisfying the requirement meets the following condition: a time interval between receiving time in the piece of searching request information satisfying the requirement and the receiving time when the searching request transmitted from the client is received is less than a first threshold.

For each piece of the searching request information satisfying the requirement in the at least one piece of the searching request information satisfying the requirement, the piece of the searching request information satisfying the requirement further meets the following condition: a distance between the user corresponding to the piece of the searching request information satisfying the requirement and the user of the client is less than a second threshold, wherein the distance is determined according to geographical position information in the piece of the searching request information satisfying the requirement.

The processing module 222 is further configured to if the number of the at least one piece of the searching request information satisfying the requirement is more than M, i.e., the number of users that respectively correspond to the at least one pieces of the searching request information and are returned to the client 21 is more than M, selecting M pieces of the searching request information, and returning the information related with users respectively corresponding to the selected M pieces of the searching request information to the client, wherein M is an integer more than 1;

During the process of selecting the M pieces of the searching request information one or all of the following principles are followed: a piece of searching request information satisfying the requirement is preferred to be selected if there are more identical items between the personal basic information of users corresponding to the M pieces of the searching request information satisfying the requirement and the personal basic information of the user X; a piece of the searching request information is preferred to be selected if there are more identical items between the personal basic information of users corresponding to the M pieces of the searching request information satisfying the requirement and features of a historically successful friend of the user X.

The processing module 222 is further configured to delete a piece of searching request information that has been stored in the server for a time period that is more than the first threshold.

The special flow of the system example shown in FIG. 2 may refer to the corresponding description of the method example shown in FIG. 1, and will not described in detail any more.

From the above description of the example, those skilled in the art may clearly appreciate that the above example may be achieved by using software together with a necessary generally used hardware platform, or by using hardware, and in many cases, the former is a preferred implementation. Based on this, the technical solution may be essentially embodied in a software product form or the part of the technical solution making contribution to the prior art may be embodied in a software product form, and the computer software product may be stored in a storage medium, and includes several instructions to make a computer device (may be a personal computer, a server or a network device, etc.) to perform the method described in the above examples.

Those skilled in the art may understand that the modules in the apparatus of the above example may be distributed in the apparatus of the example, or may be located in one or more apparatus in other examples with corresponding modifications. The modules in the above example may be combined into one module, or may be further divided into multiple sub-modules.

Based on the technical solution provided in the above example, this disclosure also proposes a machine-readable storage medium adapted to store instructions which enable a machine to perform the method for searching for a user in a social network as described herein. Specifically, a system or apparatus configured with a storage medium may be provided, the software program codes for achieving functions described in any one of the above examples are stored on the storage medium, and the computer (or CPU or MPU) of the system or apparatus is enabled to read and execute the program codes stored in the storage medium.

In such a case, the program codes itself read from the storage medium may achieve the function of any one of the above examples, thus the program codes and the storage medium storing the program codes are consist of a part of the technical solution for achieving the above method for searching for a user in a social network.

An example of the storage medium storing the program codes includes a Floppy disk, a hard disk, a magneto-optical disk, an optical disk (such as CD-ROM, CD-R, CD-RW, DVD-ROM, DVD-RAM, DVD-RW and DVD+RW), a magnetic tape, a nonvolatile memory card and a ROM. Alternatively, a communication network may be used to download the program codes from a computer of a server.

In addition, it should be noted that, the functions of any one of the above examples not only may be achieved by executing the program codes read by the computer, but also may be achieved by instructing the operating system on the computer to complete a part or all of the actual operations on the basis of the program codes.

In addition, it should understand that, the functions of any one of the above examples may be achieved by writing the program codes read by the computer into a storage configured in an extended plate inserted into the computer or into a storage configured in an extended unit connected with the computer, and then instructing the CPU mounted on the extended plate or the extended unit to complete a part or all of the actual operations on the basis of the program codes.

It can be seen, by using the technical solution of the present disclosure, in the process of searching for a user, if a time interval between a time point when the user transmits its geographical position information and the current time point is great, it should consider that the user has changed its geographical position, and thus the user will not be included in a searching result, thereby improving validity of the searching result. Furthermore, the stored request may be deleted in time, thereby more efficiently protecting privacy of the user such as the geographical position and saving storage space of a server. Also, the technical solution of the present disclosure is easy for implementation and thus is facilitate for popularization and promotion.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

The invention claimed is:

1. A method for searching for a friend for a first user in a social network platform, comprising:
    receiving, by a server, a first searching request from a first client device in response to a first user instruction from the first user to identify one or more friends for the first user, the first searching request including a first user identifier of the first user and first geographical position information of the first client device;
    storing, by the server, a first piece of searching request information associated with the first searching request, wherein the first piece of searching request information includes the first geographical position information, the first user identifier, and a first receiving time when the first searching request is received by the server;
    determining, by the server, whether the first piece of searching request information matches at least one piece of searching request information from a plurality of pieces of searching request information previously stored on the server, wherein:
        the plurality pieces of searching request information are received from one or more client devices other than the first client device, the plurality of searching request information including a second piece of searching request information received from a second client device in response to a second user instruction from a second user to identify one or more friends for the second user;
        a respective piece of searching request information includes (1) geographical position information associated with a corresponding client device of the one or more client devices, (2) a user identifier of a user associated with the corresponding client device, and (3) a receiving time when the respective piece of searching request is received at the server; and
    in accordance with a determination that the second piece of searching request information has a second receiving time within a predetermined time interval prior to the first receiving time and a geographical position information within a predetermined distance from the first geographical position information:
        returning, by the server, (1) second user information of the second user to the first client device to add the second user as a friend of the first user and (2) first user information of the first user to the second client device to add the first user as a friend of the second user, respectively; and
        deleting, by the server, the stored first piece of searching request information after the predetermined time interval from the first receiving time.

2. The method of claim 1, wherein the second user information related to the second user that is returned to the first client device comprises:
    a second user identifier of the second user, personal basic information of the second user, and the distance between the second user and the first user.

3. The method of claim 2, further comprising:
    in accordance with a determination that more than M pieces of the searching request information each of which has a receiving time within the predetermined time interval from the first receiving time and geographical position information within the predetermined distance from the first geographical position information, selecting M pieces of the searching request information, and returning user information related to the selected M pieces of the searching request information to the first client device, wherein M is an integer more than 1,
    wherein the process of selecting the M pieces of the searching request information follows one or more of the following principles:
        the M pieces of the searching request information are selected if there are one or more identical items between personal basic information associated with the M pieces of the searching request information and personal basic information of the first user; and
        the M pieces of the searching request information are selected if there are one or more identical items between the personal basic information associated with the M pieces of the searching request information and personal basic information of a previously matched friend of the first user.

4. The method of claim 1, further comprising:
    deleting, by the server, the stored second piece of searching request information after the predetermined time interval from the second receiving time.

5. A server, comprising:
    a processor for executing instructions stored in a non-transitory machine readable storage medium to:
        receive a first searching request from a first client device in response to a first user instruction from a first user to identify one or more friends for the first user, the first searching request including a first user identifier of the first user and first geographical position information of the first client device;
        store a first piece of searching request information associated with the first searching request, wherein the first piece of the searching request information includes the first geographical position information, the first user identifier, and a first receiving time when the first searching request is received by the server; and
        determine whether the first piece of searching request information matches at least one piece of searching request information from a plurality of pieces of searching request information previously stored on the server, wherein:
            the plurality pieces of searching request information are received from one or more client devices other than the first client device, the plurality of searching request information including a second piece of searching request information received from a second client device in response to a second user instruction from a second user to identify one or more friends for the second user;
            a respective piece of searching request information includes (1) geographical position information associated with a corresponding client device of the one or more client devices, (2) a user identifier of a user associated with the corresponding client device, and (3) a receiving time when the respective piece of searching request is received at the server; and in accordance with a determination that the second piece of searching request information has a second receiving time within a predetermined time interval prior to the first receiving time and a geographical position information within a predetermined distance from the first geographical position information:

return (1) second user information of the second user to the first client device to add the second user as a friend of the first user and (2) first user information of the first user to the second client device to add the first user as a friend of the second user, respectively; and delete the stored first piece of searching request information after the predetermined time interval from the first receiving time.

6. The server of claim 5, wherein the instructions stored in the non-transitory machine readable storage medium further cause the processor to:

in accordance with a determination that more than M pieces of the searching request information each of which has a receiving time within the predetermined time interval from the first receiving time and geographical position information within the predetermined distance from the first geographical position information, select M pieces of the searching request information, and return user information related to the selected M pieces of the searching request information to the first client device, wherein M is an integer more than 1, wherein the process of selecting the M pieces of the searching request information follows one or more of the following principles:

the M pieces of the searching request information are selected if there are one or more identical items between personal basic information associated with the M pieces of the searching request information and personal basic information of the first user; and the M pieces of the searching request information is selected if there are one or more identical items between the personal basic information associated with the M pieces of the searching request information and personal basic information of a previously matched friend of the first user.

7. The server of claim 5, wherein the second user information related to the second user that is returned to the first client device comprises:

a second user identifier of the second user, personal basic information of the second user, and the distance between the second user and the first user.

8. The server of claim 5, wherein the instructions further comprise:

deleting, by the server, the stored second piece of searching request information after the predetermined time interval from the second receiving time.

9. A non-transitory computer-readable storage medium comprising a set of instructions for searching for a friend for a first user in a social network platform, the set of instructions to direct at least one processor to perform operations including:

receiving, by a server, a first searching request from a first client device in response to a first user instruction from the first user to identify one or more friends for the first user, the first searching request including a first user identifier of the first user and first geographical position information of the first client device;

storing, by the server, a first piece of searching request information associated with the first searching request, wherein the first piece of searching request information includes the first geographical position information, the first user identifier, and a first receiving time when the first searching request is received by the server;

determining, by the server, whether the first piece of searching request information matches at least one piece of searching request information from a plurality of pieces of searching request information previously stored on the server, wherein:

the plurality pieces of searching request information are received from one or more client devices other than the first client device, the plurality of searching request information including a second piece of searching request information received from a second client device in response to a second user instruction from a second user to identify one or more friends for the second user;

a respective piece of searching request information includes (1) geographical position information associated with a corresponding client device of the one or more client devices, (2) a user identifier of a user associated with the corresponding client device, and (3) a receiving time when the respective piece of searching request is received at the server; and in accordance with a determination that the second piece of searching request information has a second receiving time within a predetermined time interval prior to the first receiving time and a geographical position information within a predetermined distance from the first geographical position information:

returning, by the server, (1) second user information of the second user to the first client device to add the second user as a friend of the first user and (2) first user information of the first user to the second client device to add the first user as a friend of the second user, respectively; and deleting, by the server, the stored first piece of searching request information after the predetermined time interval from the first receiving time.

10. The non-transitory computer-readable storage medium of claim 9, wherein the second user information related to the second user that is returned to the first client device comprises:

a second user identifier of the second user, personal basic information of the second user, and the distance between the second user and the first user.

11. The non-transitory computer-readable storage medium of claim 9, wherein the operations further comprise:

in accordance with a determination that more than M pieces of the searching request information each of which has a receiving time within the predetermined time interval from the first receiving time and geographical position information within the predetermined distance from the first geographical position information, selecting M pieces of the searching request information, and returning user information related to the selected M pieces of the searching request information to the first client device, wherein M is an integer more than 1, wherein the process of selecting the M pieces of the searching request information follows one or more of the following principles:

the M pieces of the searching request information are selected if there are one or more identical items between personal basic information associated with the M pieces of the searching request information and personal basic information of the first user; and the M pieces of the searching request information are selected if there are one or more identical items between the personal basic information associated with the M pieces of the searching request information and personal basic information of a previously matched friend of the first user.

12. The non-transitory computer-readable storage medium of claim 9, wherein the operations further comprise:

deleting, by the server, the stored second piece of searching request information after the predetermined time interval from the second receiving time.

* * * * *